Aug. 9, 1960  H. S. NAGIN ET AL  2,948,201
PAVEMENT AND METHOD OF PRODUCING THE SAME
Filed March 9, 1960
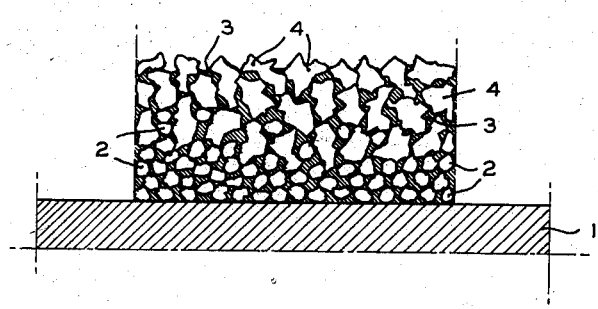
INVENTORS,
HARRY S. NAGIN
DONALD H. RUSSELL
BY Christy, Parmelee & Strickland,
ATTORNEYS

United States Patent Office 2,948,201
Patented Aug. 9, 1960

2,948,201
PAVEMENT AND METHOD OF PRODUCING THE SAME

Harry S. Nagin, Merion, Pa., and Donald H. Russell, Pennsauken, N.J., assignors to Reliance Steel Products Company, McKeesport, Pa., a corporation of Pennsylvania Filed Mar. 9, 1960, Ser. No. 11,014

26 Claims. (Cl. 94—5)

This invention relates to paving and more particularly to providing pavements such as roadways, floors, ramps, stair treads, platforms and the like with a strong wear-resistant exposed wear surface. Such pavements are of a fixed, rigid character designed to carry vehicular or pedestrian traffic and are what may generally be regarded as permanent structures in that they are designed for an indefinite life.

This application is a continuation-in-part of copending application Ser. No. 427,873, filed May 5, 1954, and also a continuation-in-part of copending application Ser. No. 444,921, filed July 21, 1954, and both applications now abandoned.

An object of the invention is to provide a method by which any traffic-bearing or pavement base may be provided with a strong wear-resistant exposed wear surface.

A further object is to provide a pavement having a strong wear-resistant exposed wear surface.

Another object is to provide a new and economical method of forming such a pavement.

The single figure of the accompanying drawing shows a diagrammatic cross-section of one form of pavement produced in accordance with the invention.

According to the invention there preferably is used a medium light to a medium heavy epoxy resin, that is, one having a syrup-like consistency. As disclosed in copending application Ser. No. 427,874, filed May 5, 1954, epoxy resins are, as an example, the reaction products of epichlorhydrin and diphenol propane, and in U.S. Patent No. 2,602,785 to Wiles, dated July 8, 1952, epoxy resins of different consistencies, and the method of producing them, are disclosed. Suitable commercial materials are "Epon" resins, grades 828, 834, 562 and "Araldite" resins, grades AN 102, AN 115 and CN 502, these materials being typical of satisfactory commercially available resins, and those enumerated are examples and are not all of the satisfactory commercially available resins of this type which may be used.

If the surface to be processed is old or has been in previous use, it is preferred that it first be thoroughly cleaned with water and detergent and, if necessary to remove oil or grease, dilute hydrochloric acid or solvent may be used. If the surface to be processed is new, as for example, a new concrete floor or roadway, no preparation is needed except to brush it clean. After cleaning the surface should be thoroughly dry to the touch, with no apparent dampness or moisture, before applying the material.

The resin above described is mixed with a catalyst which is usually a polyamine. Suitable catalysts are diethylene triamine, ethylene diamine, dimethylamino-propylamine, diethylamino-propylamine, piperidine and pyridine. The catalyst selected and the amount of catalyst used will affect the "pot life" of the resin, its curing time and the temperature at which curing takes place. Diethylene-triamine has been found to be satisfactory and the weight of the catalyst may be about 10% of the weight of the resin.

According to one procedure, the mixing and stirring of the resin and catalyst is first accomplished, after which abrasive grits or grains of suitable size are mixed into the resin and the mixture is spread by spraying, or with a screed or scraper onto the prepared pavement base. If quick curing is desired or the surrounding temperature is low, the mixture may be first heated and applied hot to the surface. Aluminum oxide grains or similar abrasive grains are used. Grains in the range between 6 and 12 mesh are suitable, but the size is not critical except that particles which are too small do not provide the desired roughness and particles which are too coarse would be excessively rough.

The mixture is spread until a uniform film is developed over the base surface with a fairly dense distribution of the abrasive particles. As the resin cures in situ in the air, the curing taking place with the resin in contact with the grains and base surface, it will adhere firmly to the base surface, be it concrete, wood, metal or stone and it will likewise adhere to the abrasive grains, thereby attaching the grains to the base firmly and more or less permanently. The resin, being a thermosetting resin, is not subsequently affected by changes of temperature of approximately 60° F. to 600° F. and it is sufficiently resilient that even when applied to metal, the differences in coefficients of thermal expansion of the resin and metal will not cause any separation. The resin itself has a wear-resistance exceeding that of normal concrete, and the abrasive grains, being hard and wear-resistant, provide additional wearing qualities. The resin has a high tensile strength and high resistance to mechanical shock, so that the surface, even under heavy traffic conditions, will remain intact and sound for a long period of time. Moreover, the material being waterproof, will protect the underlying base from moisture damage, rust or rot.

As an alternative procedure, a film of catalyst-containing resin may be applied to the base and the abrasive grains, which may or may not have a coating of the resin mix thereover, are scattered onto the film and in this manner the abrasive particles are adhered to the base.

It may be further pointed out that in preparing the wear surface, the base may be coated with a thin film of the resin-catalyst mixture which is immediately covered with an excess of abrasive grains and after the resin has cured, the excess of granular material may be swept off or otherwise removed.

The above-described methods, although suitable for many applications, have some disadvantages. When the abrasive particles are mixed with the resin and the mixture is applied to the road or other surface to be covered, difficulties arise from a practical standpoint because a mixture of resin and abrasive sufficiently heavy to give an abrasively coated surface is stiff and has poor spreadability, and difficulty is encountered in getting it evenly and thinly spread, especially since it is quite adhesive and tends to adhere to a roller or other tool used to spread or flatten it.

The method wherein the resin is first applied to the road or other surface to be covered after which abrasive particles are sprinkled thereover before the resin has set is therefore much easier, but the fluidity of the resin which can best be used causes it to flow and, on a sloped or graded surface, to run off or become too thin or uneven.

The above-mentioned difficulties are eliminated according to another modification of the invention which provides an economical, fast and practical method for forming a good surface on a road, floor, or other area to which it is applied.

According to this modification, a thermosetting resin, preferably an epoxy resin of the desired fluidity with a catalyst, is mixed with finely divided aggregate, which functions as a thickener, such as building sand, but abrasive grains may be used. For purposes of economy, sand is preferable. Sufficient sand is used to make a slurry which has good flow and spreading properties, but insufficient sand is used to make a mass which is paste-like or of low slump characteristic. Neither is the mix as highly fluid as the resin alone. The amount is not critical and will vary with different resins, outside temperature, and even perhaps the slope or grade of the surface to which it is applied. In other words, there is produced a flowable slurry with unadsorbed liquid resin, the aggregate giving body to the liquid to retard run-off but the slurry is wet enough to wet the surface of the pavement and secure a good bond at the interface of the pavement and slurry.

In carrying out this modification, there may be used any of the epoxy resins and catalysts hereinbefore set forth.

When this thickened but fluid mix is prepared, it is spread over the pavement base to be covered as a thin film. It is susceptible of being sprayed on from a pressure spray, or even a suitable gravity nozzle, or it can, on small areas, be poured out and spread with a brush, broom or other spreader until there is only a film, specked with sand. The sand, being completely surrounded by the resin, will be firmly bonded to the base surface and provide firmly anchored small key particles at close intervals over the surface. It will also tend by capillary and cohesive action to retard the free flow of the liquid and maintain a more even distribution, especially on a sloped surface or grade.

After the surface has been thus coated, hard abrasive grains or grits, or even other sand, are freely spread over the surface far in excess of the amount required, and to such extent that the coated area will be dry. Any suitable mechanical spreader may be used, or on small areas, the abrasive may be flung by hand over the coated surface. Although the resin is very adhesive, the surface thus covered may be rolled, pressing the abrasive or surfacing grains into the resin, but the roller will remain dry.

After rolling, the surface is allowed to stand until the resin has cured, which may require but a very few hours in good weather and moderate temperature, after which the surface is brushed and all non-adhering particles of abrasive are removed and collected for reuse. The particles pressed into the resin will adhere firmly and be lodged between the completely coated, firmly bonded grains of sand and will be more effectively keyed and held in place against scuffing or wheel friction than where the sand is not used. Also, the resin between the grains of sand forms a meniscus assuring a greater depth of resin than where resin alone is used, and this also serves to more firmly bond the grains which are applied after the sand-resin mix has been spread. This produces a dense surface of abrasive grains over the resin, said grains being less completely enveloped in the resin than the sand which is initially admixed with the resin.

Since the surfacing aggregate is used in an excess of the amount which the resinous layer can accept, there is formed an adherent upper layer of aggregate particles of such density as to provide a substantially continuous exposed surface of particles and consequently expose a minimum amount of resin to wear.

In the drawing there is shown a diagrammatic cross-section of a pavement produced in accordance with the last described modification. The pavement produced comprises a pavement base 1 having thereon grains of sand 2 embedded in and surrounded by the epoxy resin composition 3 and an upper layer of abrasive grains 4, some of the abrasive grains being lodged between the grains of sand. The cured resin composition 3 bonds the abrasive grains and the sand to the supporting base.

In all forms of the invention, instead of using an epoxy resin, which is preferable, there may be used an emulsion of polyvinyl acetate resin and epoxy resin with the total of resin solids in the emulsion constituting about 50% by weight and with the epoxy resin constuting not less than 50% of the total resins. This emulsion may be mixed with a catalyst and used in the manner above described. This is an example of the use of a resinous composition containing material in addition to the epoxy resin.

The invention provides a new and useful anti-skid wear-resistant surface which may be easily applied to existing roadways (i.e. highways), stairs, ramps, platforms, floors, etc. and which, while having a long life, may from time to time be repaired by re-applying the treatment above described. The invention is applicable either to a new construction or the resurfacing of existing structures.

It will, of course, be understood that variations may be practiced in the procedures above outlined and that other aggregate such as sand or gravel may be used with, or in place of, hard abrasive grains, all as understood by those skilled in the art and within the scope of the following claims. The resin should be one that is weatherproof, oil proof, resistant to mechanical shock, and which does not soften in summer heat or fracture in winter cold. Referring particularly to the last modification, while a most satisfactory surface is secured using sand in the resin mixture and abrasive grains afterward, there may be used all abrasive, all sand, or even fine gravel or crushed stone.

The present invention, therefore, is, broadly stated, directed to a method of providing a pavement having a strong wear-resistant exposed wear surface bonded to a supporting base comprising spreading over said supporting base (a) a resinous composition comprising a thermosetting epoxy resin, (b) a curing catalyst for said epoxy resin, and (c) particles of aggregate, and then effecting a reaction between said resin and catalyst to cure the resin in situ on said supporting base and to bond the aggregate to the base to provide a pavement having an exposed wear surface comprising particles of aggregate bonded to the supporting base by the resinous composition.

The particles of aggregate may be admixed with the resinous composition, may be applied separately thereover, or some of the particles may be admixed with the resinous composition with other of the particles being applied thereover. Preferably, the particles applied thereover are of a harder and different character and are densely applied with minimum of the resin exposed at the surface.

According to one form of the invention, pavements such as higwhays, ramps, paved floors and the like, are surfaced by a method comprising mixing a finely divided mineral aggregate with a thin syrupy air-curing thermosetting epoxy resin and a catalyst for the resin to form a flowable slurry with unadsorbed liquid resin, applying the slurry over a previously existing pavement to provide a continuous layer of the slurry over the pavement with the aggregate in the resin giving body to the liquid to retard run-off but wet enough to wet the surface of the pavement and secure a good bond at the interface of the pavement and slurry, thereafter spreading loose, dry, abrasive particles over the resin aggregate layer to a depth such that the resin-aggregate layer is completely covered and the exposed surface of the layer of abrasive particles is dry and in excess of the amount which the resin-aggregate layer can accept, applying pressure to the abrasive particles to press at least a portion of the particles into the thickened resin layer and to wet said portion with liquid resin, air-curing the resin and thereafter removing excess unattachd abrasive particles.

The invention comprehends the improved pavements produced by the disclosed methods.

We claim:

1. A pavement comprising a pavement-supporting base and an exposed strong wear-resistant wear surface bonded thereto, said wear surface comprising particles of aggregate and a resinous composition comprising a cured thermosetting epoxy resin, said resinous composition bonding said particles to said supporting base, some of the said particles being embedded in and surrounded by said composition and other of said particles being exposed at the surface of said composition, the exposed particles being of such a density as to provide a substantially continuous exposed surface of aggregate.

2. A pavement as recited in claim 1 wherein at least the exposed aggregate comprises abrasive particles.

3. A pavement as recited in claim 1 wherein the supporting pavement base comprises concrete.

4. As a new article of manufacture a pavement provided with a supporting base, an intermediate layer comprising a thermosetting resin carrying dispersed therethrough a mineral aggregate, said intermediate layer being adhesively bonded to said supporting base, said thermosetting resin substantially completely enveloping the particles of mineral aggregate, said thermosetting resin comprising the air-cured reaction product of a syrup-like epoxy resin and a curing catalyst therefor, said resin being resistant to softening at summer temperature and resistant to fracturing at winter temperature, said intermediate layer having disposed thereon an adherent upper layer of abrasive particles of such density as to provide a substantially continuous exposed surface of abrasive particles, at least a portion of said particles being pressed into the intermediate layer and lodged in the resin between the bonded particles of mineral aggregate.

5. The article defined in claim 4 in which the composition of the abrasive particles is different from the composition of the mineral aggregate.

6. As a new article of manufacture a pavement provided with a supporting base, an intermediate layer comprising a thermosetting resin admixed with a thickening agent therefor, said intermediate layer being adhesively bonded to said supporting base, said thermosetting resin comprising the air-cured reaction product of a syrup-like epoxy resin and a curing catalyst therefor, said resin being resistant to softening at summer temperature and resistant to fracturing at winter temperature, said intermediate layer having disposed thereon an adherent upper layer of abrasive particles of such density as to provide a substantially continuous exposed surface of abrasive particles, at least a portion of said particles being pressed into the intermediate layer and lodged in the cured thickened resin.

7. The article defined in claim 6 in which the composition of the abrasive particles is different from the composition of the thickening agent.

8. A method of providing a pavement having a strong wear-resistant exposed wear surface bonded to a supporting base comprising spreading over said supporting base (a) a resinous composition comprising a thermosetting epoxy resin, (b) a curing catalyst for said epoxy resin, and (c) particles of aggregate, and then effecting a reaction between said resin and catalyst to cure the resin in situ on said supporting base and to bond the aggregate to the base to provide a pavement having an exposed wear surface comprising particles of aggregate bonded to the supporting base by the resinous composition.

9. A method as recited in claim 8 wherein the resinous composition, catalyst and particles are simultaneously applied to the supporting base.

10. A method as recited in claim 9 wherein the resinous composition, catalyst and particles are mixed together prior to the application thereof to the supporting base.

11. A method as recited in claim 8 wherein at least the resinous composition and the catalyst are applied to the supporting base to form a layer thereon and the particles are spread, in an excess amount, over said layer prior to the curing of the resin.

12. A method as recited in claim 11 wherein the particles spread over the resinous layer comprise abrasive particles.

13. A method as recited in claim 8 wherein the supporting base comprises a material selected from the group consisting of hardened concrete, wood, metal and stone.

14. A method of providing a pavement having an anti-skid exposed surface bonded to a supporting pavement base comprising the steps of spreading over said base a layer containing a liquid thermosetting epoxy resin and a catalyst therefor, applying an excess of abrasive particles over said layer, effecting a reaction between said catalyst and said resin to cure the epoxy resin in situ to bond at least a portion of said particles to said base, and removing the unadhering particles to provide a pavement having an anti-skid exposed wear surface comprising abrasive particles bonded to the supporting base by means of the cured epoxy resin.

15. The method of providing an anti-skid wearing surface on a previously constructed supporting traffic bearing base such as a roadway or pavement which comprises spreading an epoxy resin of light syrup-like consistency and a catalyst therefor in liquid form together with abrasive grains over the surface and effecting a reaction between said catalyst and said resin to cure the resin in situ on said surface whereby the grains are firmly attached to said surface.

16. The method defined in claim 15 in which the abrasive grains are mixed with the resin and the resin-coated grains and liquid resin are simultaneously applied and spread over the surface.

17. The method of providing an anti-skid wearing surface on a previously constructed traffic bearing base such as a roadway or pavement which comprises mixing a liquid epoxy resin of light syrup-like consistency with a catalyst and applying the same before the resin has cured together with abrasive grains to the surface of the base and effecting a reaction between said catalyst and said resin to cure the resin in situ on the base.

18. The method of surfacing pavements such as highways, ramps, paved floors and the like which comprises mixing a finely divided mineral aggregate with a thin syrupy air-curing thermosetting epoxy resin and a catalyst for the resin to form a flowable slurry with unadsorbed liquid resin, applying the slurry over a previously existing pavement to provide a continuous layer of the slurry over the pavement with the aggregate in the resin giving body to the liquid to retard run-off but wet enough to wet the surface of the pavement and impregnate the pores thereof to secure a good bond at the interface of the pavement and slurry, thereafter spreading loose, dry, abrasive particles over the resin aggregate layer to a depth such that the resin-aggregate layer is completely covered and the exposed surface of the layer of abrasive particles is dry and in excess of the amount which the resin-aggregate layer can accept, applying pressure to the abrasive particles to press at least a portion of the particles into the thickened resin layer and to wet said portion with liquid resin, air-curing the resin and thereafter removing excess unattached abrasive particles.

19. The method defined in claim 18 in which the pressure is applied by means of a roller and the depth of the dry particles is sufficient to prevent the resin from contacting the roller.

20. The method of surfacing pavements such as highways, ramps, paved floors and the like which comprises mixing a thin syrupy air-curing thermosetting epoxy resin and a catalyst therefor with a thickening agent for the resin to form a thickened flowable resinous mass, applying the resinous mass over the surface of a previously existing pavement to provide a continuous layer of the resinous mass over the pavement with the thickening agent in the resin giving body to the liquid to retard run-off but wet enough to wet the surface of the pavement and impregnate the pores thereof to secure a good bond at the interface of the pavement and the thickened resinous layer, thereafter spreading loose, dry abrasive particles over the thickened resinous layer to a depth such that the thickened resinous layer is completely covered and the exposed surface of the layer of abrasive particles is dry and in excess of the amount which the thickened resinous layer can accept, applying pressure to the abrasive particles into the thickened resinous layer and to wet said portion of abrasive particles with liquid resin, air-curing the resin and thereafter removing excess unattached abrasive particles.

21. The method defined in claim 18 in which the composition of the abrasive particles is different from the composition of the mineral aggregate.

22. The method defined in claim 20 in which the composition of the abrasive particles is different from the composition of the thickening agent.

23. A method as recited in claim 8 wherein at least the resinous composition and the catalyst are applied to the supporting base to form a resinous layer thereon and the particles are spread over said layer, said particles being spread to form a layer of particles to a depth such that the particles are in excess of the amount which the resinous layer can accept and such that the resinous layer is completely covered and the exposed surface of the layer of particles is dry, and wherein pressure is applied to the layer of particles to press at least a portion of the particles into the resinous layer prior to the curing of the resin.

24. A method as recited in claim 8 wherein at least the resinous composition, the catalyst, and some of the particles are applied to the supporting base to form a layer thereon and the remaining particles are spread, in an excess amount, over said layer prior to the curing of the resin.

25. A method as recited in claim 24 wherein the particles spread over the resinous layer comprise abrasive particles.

26. A method as recited in claim 8 wherein at least the resinous composition, the catalyst, and some of the particles are applied to the supporting base to form a resinous layer thereon and the remaining particles are spread over said layer, said remaining particles being spread to form a layer of particles to a depth such that the particles are in excess of the amount which the resinous layer can accept and such that the resinous layer is completely covered and the exposed surface of the layer of particles is dry, and wherein pressure is applied to the layer of particles to press at least a portion of the particles into the resinous layer prior to the curing of the resin.

References Cited in the file of this patent

UNITED STATES PATENTS

| | | |
|---|---|---|
| 1,071,293 | Brady | Aug. 26, 1913 |
| 1,975,028 | Wallace | Sept. 25, 1934 |
| 2,165,955 | Haarhoff | July 11, 1939 |
| 2,216,250 | Nelson | Oct. 1, 1940 |
| 2,246,898 | Sayre | June 24, 1941 |
| 2,265,735 | Lampert | Dec. 9, 1941 |
| 2,330,365 | Jackson | Sept. 28, 1943 |
| 2,347,233 | Abernathy | Apr. 25, 1944 |
| 2,413,901 | Abernathy | Jan. 7, 1947 |
| 2,468,056 | Goepfert | Apr. 26, 1949 |
| 2,521,911 | Greenlee | Sept. 12, 1950 |
| 2,602,785 | Wiles et al. | July 8, 1952 |
| 2,682,515 | Naps | June 29, 1954 |
| 2,682,517 | Asaff | June 29, 1954 |
| 2,705,223 | Renfrew | Mar. 29, 1955 |
| 2,718,829 | Seymour et al. | Sept. 27, 1955 |
| 2,735,829 | Wiles et al. | Feb. 21, 1956 |
| 2,779,668 | Daniels | Jan. 29, 1957 |

FOREIGN PATENTS

| | | |
|---|---|---|
| 481,868 | Great Britain | Mar. 18, 1938 |
| 513,453 | Great Britain | Oct. 12, 1939 |

OTHER REFERENCES

Epon Surface Coating Resins Technical Publication, Sc:50–40, December 31, 1953, by Shell Chemical Corp., page 3.